United States Patent [19]
Breithaupt et al.

[11] Patent Number: 5,762,762
[45] Date of Patent: Jun. 9, 1998

[54] DISTILLATION APPARATUS

[75] Inventors: Walter T. Breithaupt, St. Catharines; Richard Merritt, Barrie, both of Canada

[73] Assignee: The Breithaupt Family Trust

[21] Appl. No.: 619,450

[22] Filed: Mar. 19, 1996

[51] Int. Cl.⁶ .................. B01D 3/02; C02F 1/04
[52] U.S. Cl. .................. 202/185.3; 159/DIG. 1; 159/DIG. 41; 202/83; 202/185.5; 203/10; 203/100; 203/DIG. 11
[58] Field of Search ............ 202/83, 189, 241, 202/185.3, 185.5; 203/10, 100, DIG. 11; 159/DIG. 1, DIG. 41; 392/398, 406

[56] References Cited

U.S. PATENT DOCUMENTS

| | | |
|---|---|---|
| 2,614,816 | 10/1952 | Hull .................. 202/185.3 |
| 3,350,279 | 10/1967 | Tolchin . |
| 3,689,367 | 9/1972 | Kassat et al. .................. 202/185.3 |
| 3,838,016 | 9/1974 | Powers . |
| 3,957,589 | 5/1976 | Mayer . |
| 4,022,669 | 5/1977 | Drostholm et al. . |
| 4,052,267 | 10/1977 | McFee . |
| 4,110,170 | 8/1978 | Kirschman et al. . |
| 4,230,530 | 10/1980 | Lemoine et al. . |
| 4,247,369 | 1/1981 | Bean . |
| 4,269,663 | 5/1981 | McFee . |
| 4,331,514 | 5/1982 | Bauer . |
| 4,339,307 | 7/1982 | Ellis, Jr. . |
| 4,342,623 | 8/1982 | Loeffler . |
| 4,420,374 | 12/1983 | Ellis, Jr. . |
| 4,687,550 | 8/1987 | Wong . |
| 4,818,344 | 4/1989 | Glucksman . |
| 4,861,465 | 8/1989 | Sweet, Jr. . |
| 4,915,793 | 4/1990 | Chou . |
| 5,110,419 | 5/1992 | Weber et al. .................. 202/105.3 |
| 5,178,734 | 1/1993 | Palmer . |
| 5,196,093 | 3/1993 | Weber et al. . |
| 5,217,580 | 6/1993 | Chen . |
| 5,286,350 | 2/1994 | Huang .................. 202/185.3 |
| 5,492,602 | 2/1996 | Vogelman et al. .................. 203/10 |
| 5,565,065 | 10/1996 | Wang .................. 202/176 |

FOREIGN PATENT DOCUMENTS

| | | | |
|---|---|---|---|
| 1090282 | 11/1980 | Canada .................. 202/185.3 |
| 3440842 | 5/1986 | Germany .................. 203/10 |
| 2277883 | 11/1994 | United Kingdom .................. 203/10 |
| 3023130 | 11/1993 | WIPO .................. 203/10 |

OTHER PUBLICATIONS

Genesis, "Operator's Manual", 1993.

*Primary Examiner*—Virginia Manoharan

[57] ABSTRACT

Water distillation apparatus for convenient domestic use including a housing containing a condenser coil and having a vapor inlet and a distillate outlet. A fan cools and condenses vapor. A boiler is releasably connected to the housing by a vapor discharge outlet in the form of an inwardly-directed cylinder and the vapor inlet has a cooperating spigot termination so that the boiler may be moved away from the vapor inlet and filled with water for batch distillation. The distilland water is heated with an electric heating element and the distillate is discharged through a carbon filter into a discrete glass pitcher adjacent to the boiler. The arrangement permits easy removal of the boiler from the housing for filling with distilland or cleaning, as well as the convenient replacement of the boiler in the housing afterwards.

7 Claims, 7 Drawing Sheets

DISTILLATION APPARATUS

FIELD OF THE INVENTION

This invention relates to a distillation apparatus, in particular, a water still for domestic usage.

BACKGROUND OF THE INVENTION

While the quality of tap water generally meets local health standards, it is often unacceptable for domestic usage, particularly where chemical treatment of the water has given the water an undesirable flavor. To address this problem, many households obtain drinking water from a separate source such as bottled spring water, a practice which is inconvenient and which can constitute a considerable expense. An alternative is to treat tap water to remove contaminants and produce water of acceptable quality. The water treatment options available include filtration and distillation. Distillation is the preferred option because filtration generally removes only a portion of the contaminants, and more sophisticated filtration systems such as reverse osmosis are very costly to operate.

Numerous water distillation apparatus have been proposed for this purpose. Such apparatus typically include a vaporization chamber that has an immersion heater whereby water contained in the chamber is vaporized. Advantage is taken of natural convection forces by collecting rising water vapor in a condensing chamber arranged above the vaporization chamber. Typically, the water vapor is air-cooled and condensed into a distillate which is discharged by means of a tap or delivered to a container by gravity. Exemplary structures of this nature may be found in the following U.S. Pat. Nos. 4,818,344; 4,269,663 and 3,957,589.

Many of these apparatus must be disassembled in order to fill the boiler with water. Very often, this requires that the condensing chamber be removed as it is usually supported on the boiler.

As the above-described arrangement is quite awkward, it is the object of this invention to provide apparatus for the distillation of water in which the above-mentioned problem is mitigated so that the apparatus will be more convenient to use and easier to clean.

SUMMARY OF THE INVENTION

In accordance with this invention, there is provided an improved distillation apparatus for domestic use, the apparatus consisting of a boiler; heating means associated with the boiler for evaporation of distilland received in the boiler; a housing having a vapor inlet adapted to receive vapor from the boiler, and a distillate outlet adapted to discharge distillate into a distillate container; condensing means received in said housing and comprising a condenser coil connecting said vapor inlet to said distillate outlet and air circulation means which, in use, directs air over the condenser coil and is adapted to cool and condense vapor in the condenser coil, and a distillate container adapted to receive distillate, the improvement comprising:

the housing having a horizontally-extending portion disposed above said boiler and distillate container and which contains the condensing means, and a vertically-extending portion disposed behind said boiler and distillate container, said vapor inlet extending horizontally through said vertically-extending portion toward the boiler;

the boiler and the distillate container comprising discrete containers, the boiler having a horizontally-extending vapor discharge opening adapted for sealing engagement with said vapor inlet, said vapor discharge opening being disengageable from the housing and adapted to allow the boiler to become separated from the housing for filling with distilland for batch distillation; and the distillate container being removable from the apparatus and adapted to dispense distillate.

BRIEF DESCRIPTION OF THE DRAWINGS

A preferred embodiment of the invention is described below by way of example with reference to the accompanying drawings, in which.

DESCRIPTION OF THE PREFERRED EMBODIMENT

Figure 1:
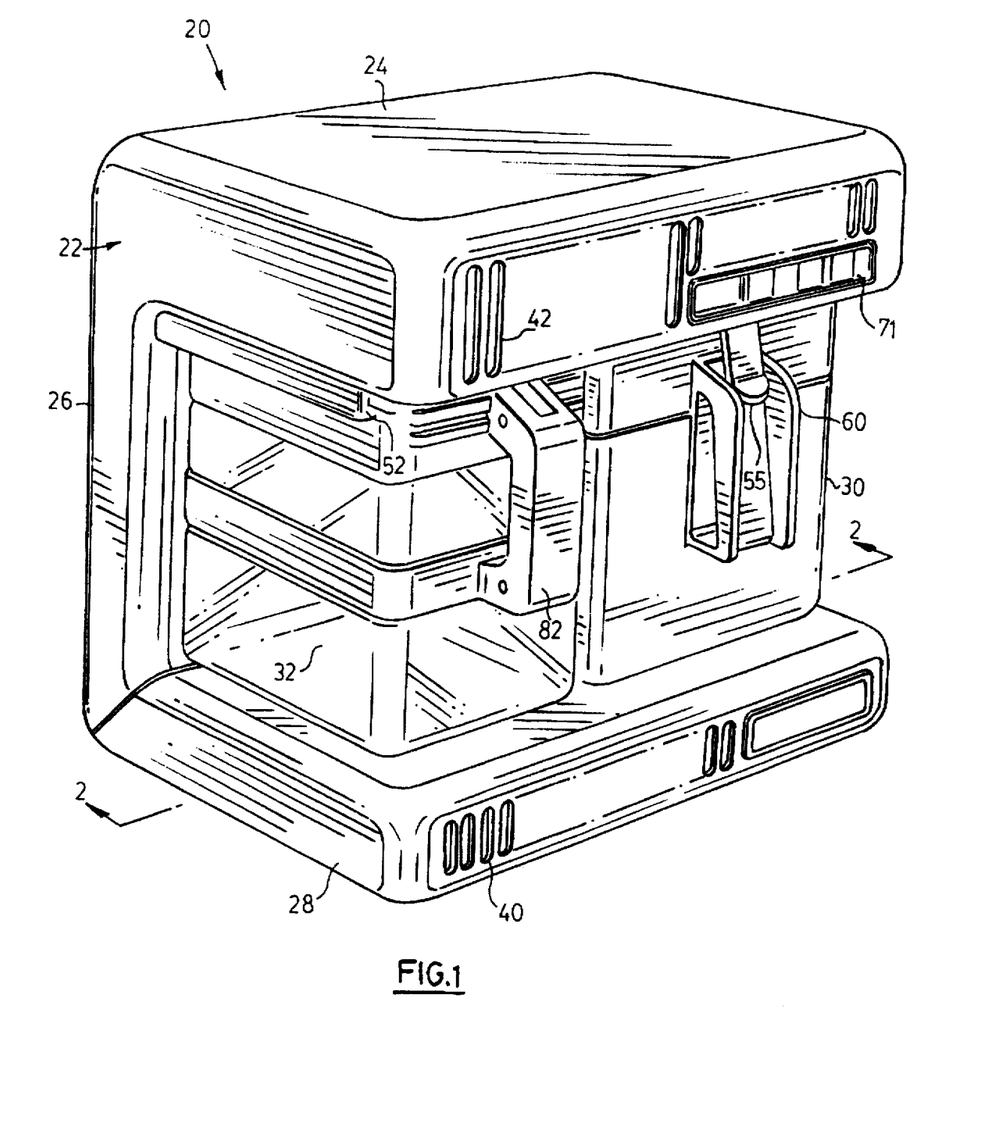
FIG. 1 is a perspective view of distillation apparatus made according to the invention.

The distillation apparatus according to the invention is generally indicated by numeral 20 in FIG. 1. It will be seen that the apparatus 20 comprises a hollow housing 22 having a top, rear, and bottom side, 24, 26, 28 respectively, the sides being arranged in a substantially C-shaped configuration as seen from the side of the apparatus with the top side 24 spaced from and overhanging the bottom side 28. The bottom side 28 rests on feet 29. A boiler 30 is received between the top and bottom sides 24, 28 and a distillate container for purified water 32 is similarly provided between the top and bottom sides 24, 28 adjacent the boiler 30. The apparatus is dimensioned for convenient location on a kitchen countertop and may be provided with accessories for suspension from the underside of a cupboard overhanging a countertop.

Figure 2:
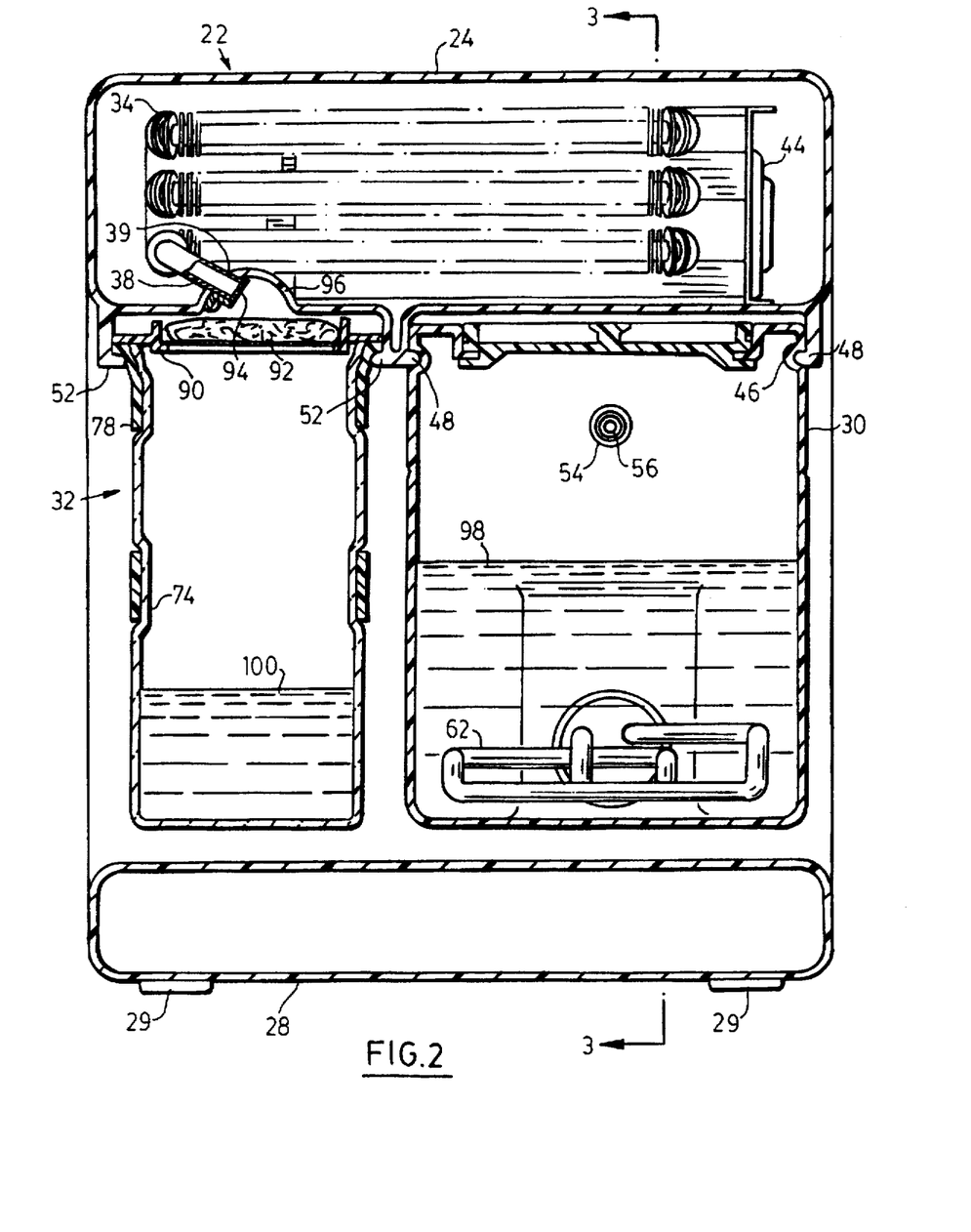
FIG. 2 is a partly-sectioned view of the front of the apparatus taken on line 2—2 of FIG. 1.
Figure 3:
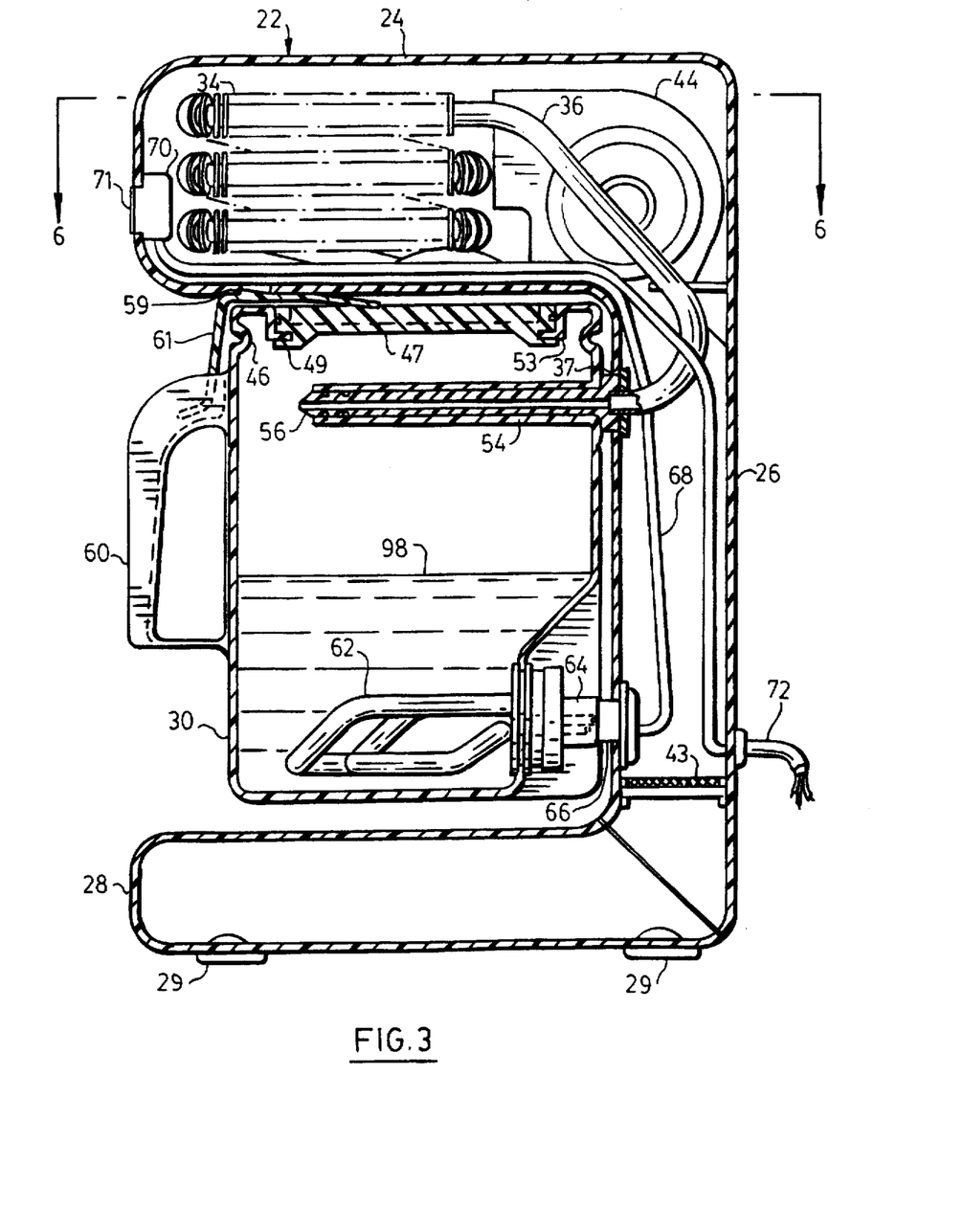
FIG. 3 is a partly-sectioned view from the side of the apparatus taken on line 3—3 of FIG. 2 showing a boiler for the apparatus.
Figure 9:
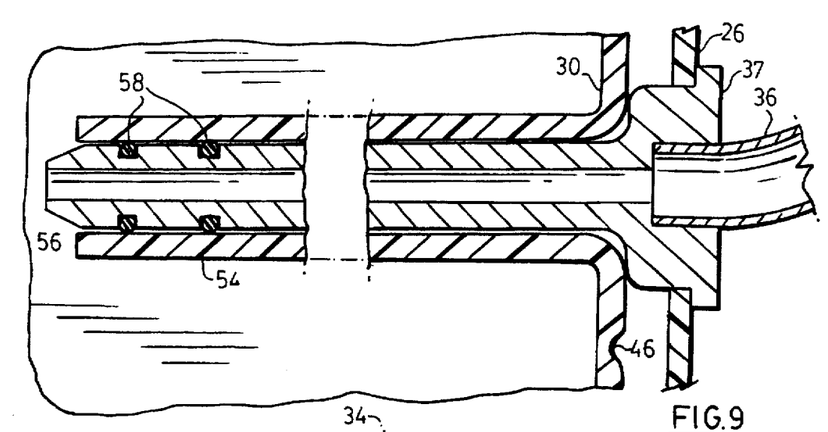
FIG. 9 is a detailed cross-sectional view showing the connection between a vapor discharge opening in the boiler and a vapor inlet in the housing.

Referring now more particularly to FIGS. 2 and 3, the housing 22 houses a finned condenser coil 34 arranged in the top side 24 and supported by ring fasteners to the housing. The condenser coil 34 has an inlet 36 at one end and an outlet 38 at the other end connecting a vapor inlet 37 fitted to the rear side of the housing (FIG. 9) to a distillate outlet 39 in the form of an opening formed in the top side 24 of the housing and which receives the outlet 38 therethrough. The inlet 36 receives vapor from the boiler 30 and the outlet 38 discharges into the distillate container 32.

Figure 6:
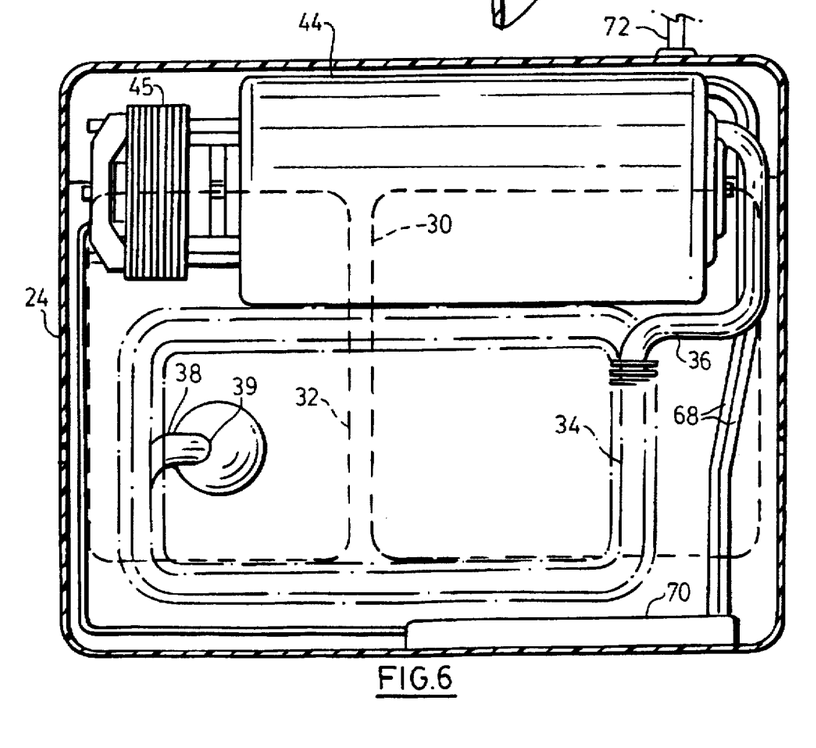
FIG. 6 is a partly-sectioned view from the top taken on line 6—6 of FIG. 3.

The bottom side 28 and the top side 24 are apertured to define air inlet and air outlet means 40, 42 respectively (FIG. 1). Air circulation means in the form of a squirrel cage fan 44 driven by motor 45 (FIG. 6) and supplied with household current is provided inside the housing and, in use, aspires air through a filter 43 located in the rear side 26 of the housing between the air inlet and outlet means. Thus, cool ambient air is directed by the fan 44 over the condenser coil 34.

The boiler 30 has a circumferential groove 46 adjacent the top adapted to slidably receive on opposite sides thereof a pair of cooperating lips 48 formed on the under-surface of the top side 24. The boiler 30 is thereby suspended from the housing 22 so as to be spaced from the bottom side 28 and slidable away from the rear side 26. The distillate container 32 is similarly suspended from lips 52 provided on the under-surface of the top side 24.

A vapor discharge opening 54 is provided on the rear surface of the boiler 30 adjacent the rear side 26 of the housing 22. The vapor discharge opening 54 is in the form of an inwardly-directed cylinder lying substantially horizontally and penetrating a substantial distance into the boiler 30. The opening 54 is adapted to sealingly receive a spigot termination 56 of the vapor inlet 37, which protrudes from the front surface of the rear side 26, by means of a pair of longitudinally-spaced O-rings 58 provided on the spigot termination 56 (see detail of FIG. 9).

A handle 60 is provided on the boiler 30 opposite the vapor discharge opening 54 to enable a user to grasp the container and slide the boiler toward or away from the spigot termination 56 of the vapor inlet 37, as the case may be.

Figures 5, 5A:
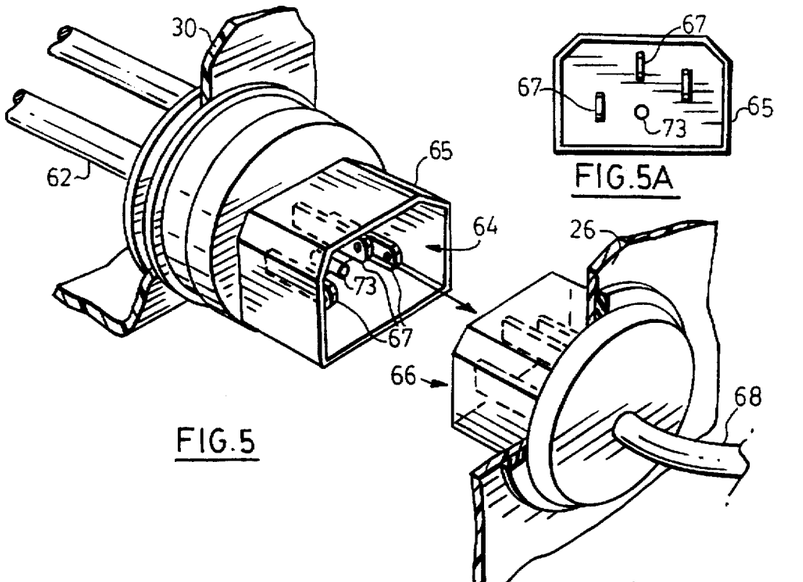
FIG. 5 is a partly-sectioned perspective view showing the electrical connection between a heating element in the boiler and a housing for the apparatus.
FIG. 5A is a plan view of an electric plug attached to the boiler and forming part of the electrical connection between the boiler and the housing.

An immersion heating element 62 is provided in the boiler 30 near the bottom and is electrically connected to a customized electric plug 64 (male end) protruding from the boiler 30 on the rear surface (see detail of FIG. 5).

The operatively rear surface of the boiler is recessed so as to accommodate the plug 64 between the boiler 30 and the rear side 26 of the housing 22.

As best seen in FIG. 5A, the plug 64 has three prongs 67, as is common in the art, but the prongs are arranged asymmetrically so that the user cannot mistakenly plug the boiler 30 into any household socket or extension cord. The plug 64 is also received in a safety enclosure 65 for this purpose and a customized electric socket 66 (female end) protruding from the inner surface of the rear side 26 of the housing 22 is dimensioned to fit inside the enclosure 65 and receive the prongs 67.

The socket 66 (FIG. 3) and the fan motor 45 (FIG. 6) are connected by electrical leads 68 to a terminal block 70 fixed to the top side of the housing 22 and to an electric cord 72 having a plug (not shown) adapted for connection to a household supply of electrical current.

A set of control buttons 71 (FIG. 1) accessible from outside the apparatus 20 operate a switch to turn the apparatus on. For added protection, a reset button 73 (FIGS. 5 and 5A) is provided in the safety enclosure 65 and operates to automatically disable the electrical circuit between the heating element 62 and the terminal block 70 (FIG. 3) when the heating element 62 reaches a predetermined temperature.

Figure 4:
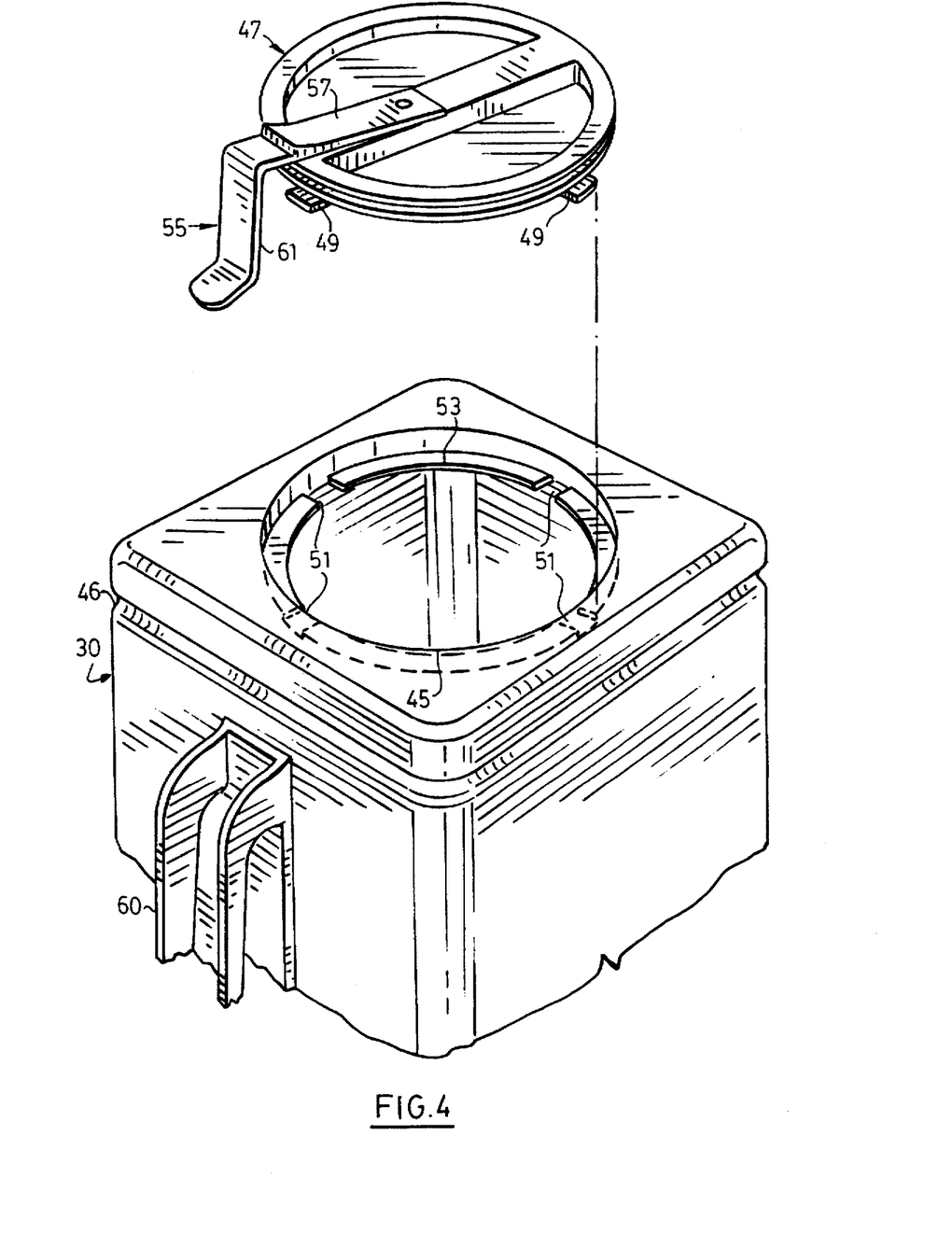
FIG. 4 is an exploded perspective view from the top of a boiler showing a lid removed from the top of the boiler.
Figure 8:
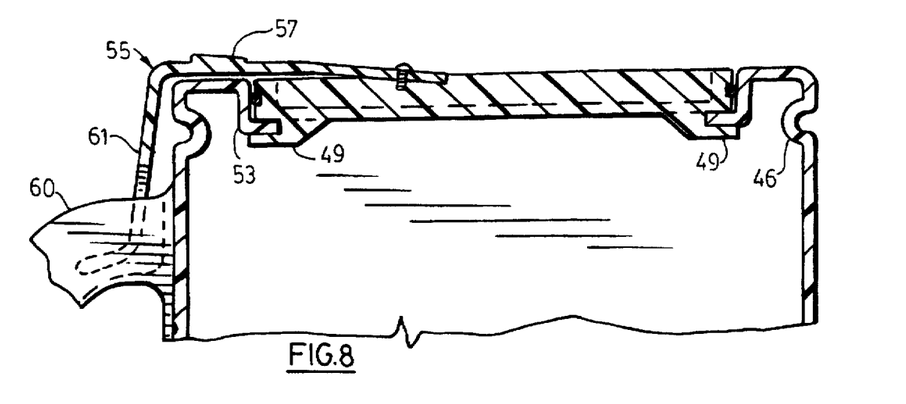
FIG. 8 is a detailed cross-sectional view showing the lid arranged in the top of the boiler.

As seen more clearly in FIGS. 4 and 8, the boiler 30 has a wide circular refill opening 45 at the top closed by a lid 47 having a plurality of radially-spaced downwardly-extending tabs 49 which cooperate in bayonet fashion with corresponding notches 51 in a circumferential lip 53 adjacent the opening 45. A clip 55 adjacent the top surface of the lid 47 has a barb 57 which is upwardly-biased toward engagement with a detent 59 (FIG. 3) provided in the undersurface of the top side 24 (FIG. 3) and is released by depressing an outwardly-projecting tongue 61 which forms part of the clip 55. For aesthetic reasons, the tongue 61 locates between channel-like formations on the handle 60.

Figure 7:
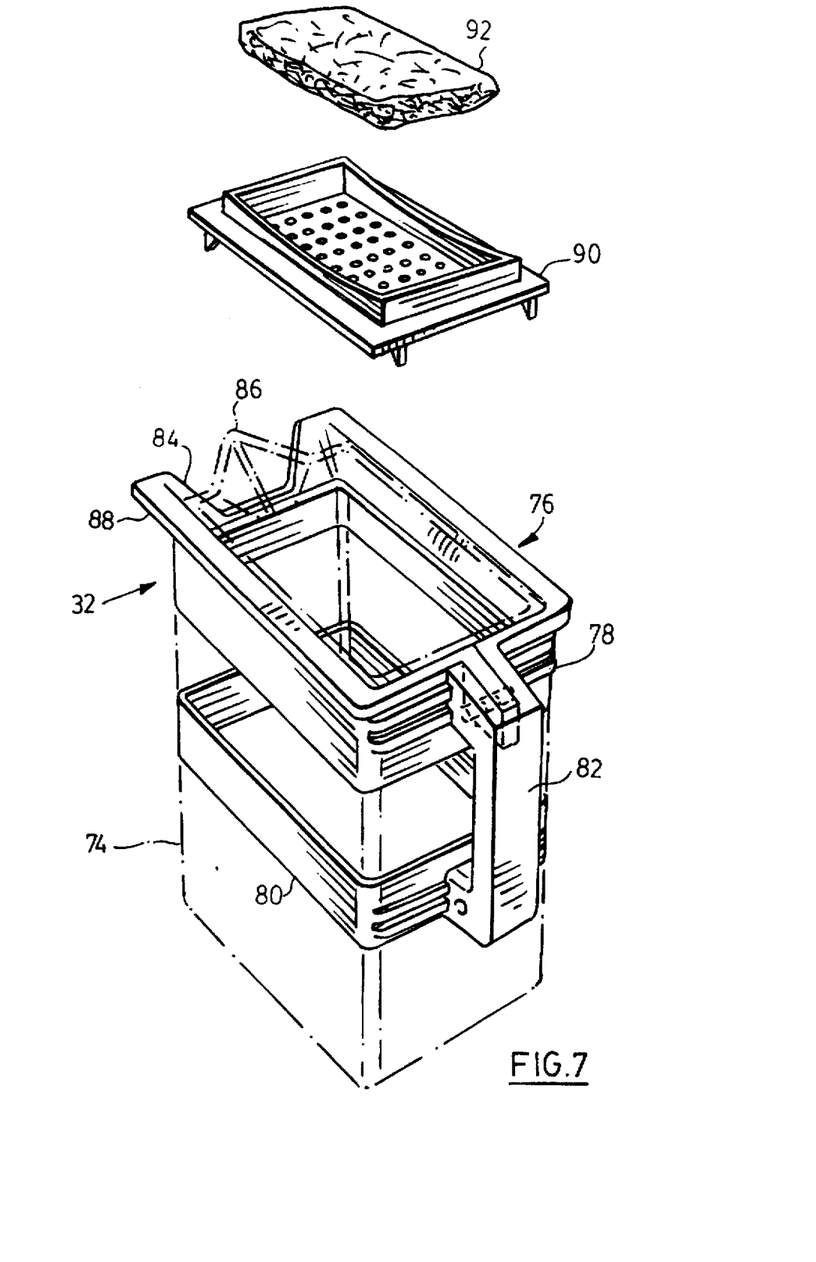
FIG. 7 is an exploded perspective view from the top of a portion of a distillate container forming part of the apparatus showing a filter and screen elements removed from the top of the container.
Figure 10:
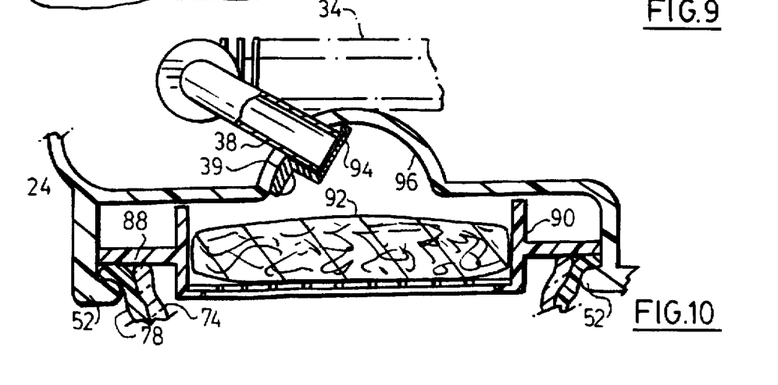
FIG. 10 is a detailed cross-sectional view showing the distillate outlet means.

The distillate container 32 (FIG. 7) comprises a glass pitcher 74 slidably received in a synthetic plastic sleeve 76 comprising upper and lower circumferential elements 78, 80 connected by a handle 82. The upper circumferential element 78 is molded with a gap 84 opposite the handle 82 to accommodate a pouring spout 86 formed in the glass pitcher 74 and has an outwardly-extending flange 88 between the gap 84 and the handle 82 for suspension from the lips 52 (see detail FIG. 10).

A perforated tray 90 (FIGS. 2 and 10) nests in the pitcher 74 and is shaped to receive a carbon filter sac 92. The condensate exits from the outlet through a screen mesh cover 94 accessible for cleaning through a recess 96 provided in the under-surface of the top side 24.

In use, the boiler 30 is filled with tap water or distilland 98 through the opening 45 (FIG. 4) which conveniently is sufficiently large to allow a user to clean the interior of the boiler and to inspect it for residue or damage to the heating element 62. Because of its inward configuration and length, the likelihood of distilland spilling out of the discharge opening 54 is minimized, as is the likelihood of any vapor escaping and scalding a user. The lid 47 is placed in the boiler 30 with the tabs 49 in alignment with the notches 51 and is then twisted into a lock position thereby forming a vapor seal. The boiler is then slid towards the front side of the housing 26 along the lips 48 until the barb 57 engages the detent 59 such that the spigot termination 56 is received in the vapor discharge opening 54 and the socket 66 is received in the safety enclosure 65 for the electric plug 64.

It will be appreciated that the unique socket arrangement and configuration of the prongs operate to minimize the risk of plugging the apparatus 20 into an inappropriate socket. With the apparatus 20 plugged in, actuation of the switch 71 and reset button 73 causes the electric heating element 62 to heat up and the water 98 to evaporate. Water vapor exits the boiler 30 through the vapor discharge opening 54 into the inlet 36 of the condenser coil 34.

Actuation of the switch 71 also causes the squirrel cage fan 44 to rotate and direct air onto the condenser coil 34, the air being channeled through the hollow housing 20 between the air inlet means 40 and the air outlet means 42 and through the air filter 43. This causes the water vapor to condense and drip down under the influence of gravity out of the outlet 38 of the condenser coil 34 whereupon it is filtered through the carbon filter sac 92 and discharged into the distillate container 32 to collect in a pool of purified water or distillate 100.

The distillate 100 is accessible by simply sliding out the distillate container 32 and pouring it out of the spout 86. It will be appreciated that glass has been selected for making the pitcher 74 so that the purified water or distillate 100 does not become contaminated with toxins which could possibly be released by a pitcher made, for example, from synthetic plastic material.

The elegance of this invention resides in its simplicity. It will be appreciated that several variations may be made to the above-described embodiment of the invention without departing from the scope of the appended claims. In particular, with an appropriate choice of materials for constructing the apparatus, the electric heating, element 62 could be provided in the bottom side 28 of the housing 22, in which case the distilland 82 would be heated by conduction through the bottom of the boiler 30. In such an arrangement, the boiler would be placed adjacent a conductive heating plate provided in the bottom side of the housing 22. Furthermore, it will be appreciated that the vapor discharge opening 54A and vapor inlet 37 may be in the form of complementary male and female members, respectively, as an alternative to female and male members, respectively, only the latter being shown in the preferred embodiment.

Conveniently, the distillation apparatus 20 is supported by the feet 29 on a kitchen countertop. Alternatively, the apparatus may be suspended from a cupboard overhanging a counter.

We claim:

1. In a distillation apparatus for domestic use, the apparatus consisting of a boiler; heating means associated with the boiler for evaporation of distilland received in the boiler; a housing having a vapor inlet means for receiving vapor from the boiler, and a distillate outlet means for discharging distillate into a distillate container; condensing means received in said housing and comprising a condenser coil connecting said vapor inlet means to said distillate outlet means and air circulation means for directing air over the condenser coil for cooling and condensing vapor in the condenser coil, and a distillate container for receiving distillate, the improvement comprising:

the housing consists of a horizontally-extending means disposed above said boiler and distillate container for containing the condensing means, and a vertically-extending means disposed behind said boiler and distillate container;

said vapor inlet means has a spigot termination extending horizontally through said vertically-extending means toward the boiler;

the boiler and the distillate container are discrete containers disposed side-by-side and independently removable from the apparatus for filling with distilland and for dispensing distillate respectively, the boiler having a horizontally-extending vapor discharge means in the form of an inwardly-directed cylinder in releasable sealing engagement with said spigot termination of said vapor inlet means received therein, said vapor discharge means being disengageable from the vapor inlet means for allowing the boiler to become separated from the housing for filling with distilland for batch distillation; and electric plug means for connection to an electric heating element, the electric plug means extending outwardly from the boiler in parallel to the vapor discharge means and cooperable with electric socket means received in said vertically-extending means of the housing.

2. Distillation apparatus according to claim 1 wherein the electric heating element is contained in the boiler for immersion in said distilland.

3. Distillation apparatus according to claim 1 in which the boiler has a wide-mouthed opening at the top thereof for filling the boiler with distilland and for allowing the interior of the boiler to be inspected and cleaned.

4. Distillation apparatus according to claim 1 in which the boiler has a handle for withdrawing the boiler from the apparatus, the handle being oppositely disposed from said vapor discharge means.

5. Distillation apparatus according to claim 1 in which both the distillate container and the boiler are suspended from the horizontally-extending means of the housing.

6. Distillation apparatus according to claim 1, further comprising a base in the form of a second horizontally-extending means for supporting the apparatus, said horizontally-extending means for containing the condensing means being vertically spaced from and overhanging said base so that said housing has a C-shaped configuration as seen from the side of the apparatus.

7. In a distillation apparatus for domestic use, the apparatus consisting of a boiler; heating means associated with the boiler for evaporation of distilland received in the boiler; a housing having a vapor inlet means for receiving vapor from the boiler, and a distillate outlet means for discharging distillate into a distillate container; condensing means received in said housing and comprising a condenser coil connecting said vapor inlet means to said distillate outlet means and air circulation means for directing air over the condenser coil for cooling and condensing vapor in the condenser coil, and a distillate container for receiving distillate, the improvement comprising:

the housing consists of a first horizontally-extending means disposed above said boiler and distillate container for containing the condensing means, a vertically-extending means disposed behind said boiler and distillate container and a base in the form of a second horizontally-extending means for supporting the apparatus, said first horizontally-extending means for containing the condensing means being vertically spaced from and overhanging said base so that said housing has a C-shaped configuration as seen from the side of the apparatus;

said vapor inlet means has a spigot termination extending horizontally through said vertically-extending means toward the boiler;

the boiler and the distillate container are discrete containers disposed side-by-side and independently removable from the apparatus for filling with distilland and for dispensing distillate respectively, the boiler having a horizontally-extending vapor discharge means in the form of an inwardly-directed cylinder in releasable sealing engagement with said spigot termination of said vapor inlet means received therein, said vapor discharge means being disengageable from the vapor inlet means for allowing the boiler to become separated from the housing for filling with distilland for batch distillation; and electric plug means for connection to an electric heating element, the electric plug means extending outwardly from the boiler in parallel to the vapor discharge means and cooperable with electric socket means received in said vertically-extending means of the housing.

* * * * *